United States Patent
Grohman

(10) Patent No.: US 6,737,006 B2
(45) Date of Patent: May 18, 2004

(54) COMPOSITE PRODUCTS COMPRISING CELLULOSIC MATERIALS AND SYNTHETIC RESINS AND METHODS OF MAKING THE SAME

(75) Inventor: Martin Grohman, Biddeford, ME (US)

(73) Assignee: Correct Building Products, L.L.C., Biddeford, ME (US)

( * ) Notice: Subject to any disclaimer, the term of this patent is extended or adjusted under 35 U.S.C. 154(b) by 321 days.

(21) Appl. No.: 09/790,117

(22) Filed: Feb. 21, 2001

(65) Prior Publication Data

US 2002/0063358 A1 May 30, 2002

Related U.S. Application Data

(62) Division of application No. 09/691,772, filed on Oct. 18, 2000, now Pat. No. 6,586,503.

(51) Int. Cl.⁷ .................................. B29C 47/00
(52) U.S. Cl. .................. 264/211.21; 264/331.17
(58) Field of Search .................. 264/171.11, 211.21, 264/331.17

(56) References Cited

U.S. PATENT DOCUMENTS

| | | | |
|---|---|---|---|
| 4,228,116 A | | 10/1980 | Colombo et al. |
| 4,717,743 A | * | 1/1988 | Wakabayashi et al. .......... 524/13 |
| 5,088,910 A | | 2/1992 | Goforth et al. |
| 5,516,472 A | | 5/1996 | Laver |
| 5,518,677 A | | 5/1996 | Deaner et al. |
| 5,695,874 A | * | 12/1997 | Deaner et al. .............. 428/326 |
| 5,709,933 A | * | 1/1998 | Evans .................... 428/297.4 |
| 5,851,469 A | | 12/1998 | Muller et al. |
| 6,057,514 A | * | 5/2000 | Maguire .................... 177/105 |
| 6,153,293 A | | 11/2000 | Dahl et al. |

OTHER PUBLICATIONS

Polymers—A Propoerty Database, Chapman & Hall/CRC Press, 2000.*

* cited by examiner

*Primary Examiner*—Mark Eashoo
(74) *Attorney, Agent, or Firm*—Hovey Williams LLP

(57) ABSTRACT

New wood-synthetic resin composite products and methods of forming these products are provided. The products comprise a cellulosic or fibrous material and polypropylene (preferably reactor flake polypropylene). The products are formed by passing ingredients including the fibrous material and polypropylene through an extruder (preferably a twin screw extruder) at temperatures of from about 150–260° C. The extruded composite products have physical properties very similar to those of natural wood, including high tensile strengths, high compressive strengths, and high densities.

18 Claims, No Drawings

COMPOSITE PRODUCTS COMPRISING CELLULOSIC MATERIALS AND SYNTHETIC RESINS AND METHODS OF MAKING THE SAME

This application is a divisional of U.S. patent application Ser. No. 09/691,772, filed Oct. 18, 2000, U.S. Pat. No. 6,586,503, incorporated by reference herein.

BACKGROUND OF THE INVENTION

1. Field of the Invention

The present is concerned with new wood-synthetic resin composite products and extrusion processes for forming these products.

2. Description of the Prior Art

Although wood is a naturally reproducible resource, the demand for wood is consistently high. Furthermore, the supply of good wood for construction purposes is beginning to diminish. Accordingly, there is an increasing urgency to find alternative sources of wood. One possible alternate source is through the production of artificial wood from a mixture of ingredients including recycled wood scraps such as wood meal, wood chips, saw dust, and newspapers, which are each by-products of industrial wastes and other industries using natural wood products.

Composite materials consisting of recycled wood scraps and a thermoplastic material have been known for many years. Generally, these composites are formed so that they may be used in many of the same applications as an all-wood product while offering advantages such as high resistance to rot, insects, and moisture. These products can have the same workability as wood and are splinter-free. However, these composites have not been successfully used as a direct replacement for wood.

Forming a wood-polymer composite into a final product has been accomplished using most of the techniques used for forming all-polymer products, including extrusion. While the technology for extruding all-polymer products is well developed with fairly predictable results, the extrusion of a wood-thermoplastic composite material using recycled input materials is subject to a much wider variance in the molecular makeup and physical characteristics of the input materials, depending upon available resources of the recycled material. Moreover, a wood-thermoplastic composite has unique melt flow characteristics which prevent the literal translation of polymer extrusion techniques for use in composite material extrusion.

Previous extruded wood-polymer composites have generally comprised polyethylene as the polymer. While extrusion processes are the preferred method for forming these composites due to the ease with which large quantities of the composite can be readily manufactured, it has previously been impossible to form wood-polypropylene composites by counter-rotating, twin screw extrusion processes in a commercially feasible manner. That is, manufacturers were unable to develop process conditions which properly processed large quantities of polypropylene without damaging the wood. Thus, there is a need for processes for extruding polypropylene and wood or other cellulosic materials to yield suitable composite products.

SUMMARY OF THE INVENTION

The present invention fills this need by broadly providing wood-synthetic resin composite products and methods of forming such products by extrusion processes.

In more detail, the products are formed by introducing ingredients including respective quantities of a fibrous or cellulosic material and polypropylene into the inlet of an extruder (preferably a twin screw extruder). Preferably, the weigh blender is positioned immediately above the extruder, at the extruder inlet, so that the blend of ingredients is formed immediately prior to entering the extruder, thus minimizing or preventing separation of the ingredients. This is not the case with prior art processes which convey the ingredients to, or "cram" the ingredients into, the extruder inlet so as to cause separation of the ingredients and yield an inferior composite product-The screw(s) is then rotated at a rate of from about 10–50 rpm, and preferably from about 15–34 rpm to advance the ingredients through the extruder barrel and out the extrusion die to form the composite product. Preferably, the screw(s) has a compression ratio of from about 2:1 to about 4:1, and more preferably from about 2.8:1 to about 3.6:1.

The temperature of the ingredients in the extruder barrel is preferably from about 150–260° C., and more preferably from about 175–230° C. The retention time of the ingredients in the barrel should be from about 20–120 seconds, and more preferably from about 40–80 seconds. Finally, the ingredients should be advanced through the barrel at a rate of from about 500–2,000 lbs/hr., and more preferably from about 1,000–1,500 lbs/hr.

The fibrous material is preferably present in the ingredients at a level of from about 20–80% by weight, more preferably from about 30–70% by weight, and even more preferably from about 50–70% by weight, based upon the total weight of the ingredients taken as 100% by weight. The polypropylene is preferably present in the ingredients at a level of from about 20–80% by weight, more preferably from about 30–70% by weight, and even more preferably from about 30–50% by weight, based upon the total weight of the ingredients taken as 100% by weight.

Preferred fibrous materials include those selected from the group consisting of sawdust, newspaper, alfalfa, wheat pulp, wood scraps (e.g., ground wood, wood flour, wood flakes, wood chips, wood fibers, wood particles), wood veneers, wood laminates, cardboard, straw, cotton, rice hulls, paper, coconut shells, peanut shells, bagasse, plant fibers, bamboo fiber, palm fiber, kenaf, and mixtures thereof. Furthermore, the average particle size of the fibrous material should be less than about ½ inch, and more preferably from about 1/16–¼ inch. Finally, the particles of the fibrous material should have an average aspect ratio (i.e., the ratio of the length to the widest thickness) of at least about 10:1, preferably at least about 20:1, and more preferably from about 30:1 to about 50:1. The use of such long particles increases the flexural modulus of the product as compared to products with lower aspect ratios by at least about 25%, and preferably at least about 40%, thus causing the final composite product to have a stiffness comparable to natural wood.

The preferred polypropylene for use in the invention is reactor flake polypropylene (i.e., the polymer flakes as they are produced in the reactor), preferably without any further treatment (e.g., without the addition of chemical additives or modifiers) to the polypropylene. The preferred polypropylene has a melt index at 230° C. of from about 0–10 g/10 min., preferably from about 0.1–4 g/10 min., and more preferably from about 0.1–1 g/10 min. Furthermore, it is preferred that the polypropylene has a bulk density of from about 20–40 lbs/ft$^3$, and more preferably from about 28–32 lbs/ft$^3$. The average fiber length or particle size of the polypropylene flakes utilized should be from about 350–1,000 µm, and preferably from about 500–700 µm.

The resulting composite product is in the form of a self-sustaining body and has an ASTM D-6109 flexural modulus of from about 600–1,100 psi/1000 (i.e. 600,000–1,100,000 psi), and preferably from about 800–1,100 psi/1,000 (i.e. 800,000–1,100,000 psi). The product should have an actual density of from about 40–60 lbs/ft$^3$, and preferably from about 50–58 lbs/ft$^3$.

A number of optional ingredients can also be added to modify or adjust the properties of the final composite product. Examples of such ingredients include acrylic process aids (e.g., Rohm and Haas K175, Kaneka Kane-Ace PA-101), UV stabilizers (e.g., CYTEC 38535, CYTEC 3346), and coloring agents. If a process aid is utilized, it is preferably present in the ingredients at a level of from about 0.5–5% by weight, and more preferably from about 1–2% by weight, based upon the total weight of the ingredients taken as 100% by weight. Unexpectedly, these acrylic process aids are particularly useful in the present invention in spite of the fact that they are intended to be used in PVC products rather than polypropylene products.

It will be appreciated that the inventive method allows for the formation of high-strength, high-stiffness composite products having properties which greatly resemble the properties of natural wood. Furthermore, the inventive composite products are much stiffer than prior art polyethylene-cellulosic fiber products due to the fact that polypropylene is used. The products can be used in a wide number of areas including door sills and jambs, fascia board, window edging, window sills, decorative architectural trim (e.g., deck or patio railing), simulated hardwood flooring, and landscaping products (e.g., raised bed edging, flowerbed edging, driveway edging).

DETAILED DESCRIPTION OF THE PREFERRED EMBODIMENTS

Example

The following example sets forth preferred methods in accordance with the invention. It is to be understood, however, that this example is provided by way of illustration and nothing therein should be taken as a limitation upon the overall scope of the invention.

The concentrations of ingredients used in this example and settings on the Extrusiontek Milacron CM92HP twin screw extruder (available from ExtrusionTek Milacron) are shown in Table 1. The wood shavings were fed through a forced air dryer (set at a temperature of 150° C.) after which they were conveyed from the exit of the dryer, via an auger conveyor, directly into a weigh blender which weighed and proportioned the ingredients as indicated. The weigh blender was mounted directly on the feed throat or inlet of the extruder on a piece of square tubing sufficiently high to generate a stack of material on the feed throat of the extruder so as to force the material into the extruder under its own weight and to prevent separation of the ingredients.

From the feed throat, the counter-rotating screws conveyed the material through a series of zones within the extruder barrel. The preferred zones are as follows: a feed zone with high surface and intake volume to begin melting of the resins; a precompression zone to begin the mixing of the ingredients and further melting of the resins; a compression zone to accelerate the melting and form a seal for the last zone; and a metering zone where the high viscosity blend is forced through the outlets of the extrusion die under pressure.

TABLE 1

|  |  | Run #1 | Run #2 | Run #3 |
|---|---|---|---|---|
| INGREDIENTS |  |  |  |  |
| ¼" Birch Shavings | lbs/hr | 60 | 60 | — |
| ¼" Mixed Hardwood Shavings | lbs/hr | — | — | 60 |
| Solvay HB9000 Polypropylene[a] | lbs/hr | 40 | 40 | 40 |
| Rohm and Haas Paraloid K175[b] | lbs/hr | 1.2 | 1.2 | — |
| Kaneka Kane-Ace PA-101[c] | lbs/hr | — | — | 1.2 |
| Polyvisions Polyfoam CFA-3245[d] | lbs/hr | 0.4 | 0.4 | 0.4 |
| UV Stabilizers[e] | lbs/hr | 0.3 | 0.3 | 0.3 |
| EXTRUSION INFORMATION |  |  |  |  |
| Zone 1 Temperature | ° F. | 440 | 420 | 400 |
| Zone 2 Temperature | ° F. | 450 | 450 | 450 |
| Zone 3 Temperature | ° F. | 380 | 380 | 380 |
| Zone 4 Temperature | ° F. | 380 | 380 | 380 |
| Zone 5 Temperature | ° F. | 380 | 380 | 380 |
| Screw Oil Temperature | ° F. | 300 | 300 | 300 |
| DIE ZONES |  |  |  |  |
| Zone 1 (Restrictor) | ° F. | 400 | 400 | 400 |
| Zones 2–6 | ° F. | 440–500 | 440–500 | 440–500 |
| Amps |  | 90 | 150 | 200 |
| Vacuum Vent | in. Hg | 26 | 27 | 28 |
| Screw Thrust | % | 3 | 6 | 8 |
| Screw Speed | rpm | 14 | 21 | 28 |
| PREHEATER OR VMEDS[f] |  |  |  |  |
| Barrel | ° F. | — | — | 340 |
| Screw | ° F. | — | — | 340 |
| Screw, preheater | rpm | — | — | 40 |
| Amps |  | — | — | 4 |
| Output Rate | ft/min | 3.5 | 5 | 7 |
| Weight | lbs/ft | 2.2 | 2.2 | 2.2 |
| Flexural Modulus | psi/1000 | 850 | 850 | 850 |

[a]Obtained from Solvay Corporation.
[b]This is a process aid obtained from Rohm and Haas Corp.
[c]This is a process aid obtained from Kaneka Corp.
[d]This is a blowing agent obtained from Polyvisions, Inc.
[e]The UV stabilizers utilized were CYTEC 3853S and CYTEC 3346 obtained from Cytec Corp.
[f]VMEDS is an abbreviation for Vertical Melt Enhancement Delivery System.

I claim:

1. A method of forming a wood-synthetic resin composite product, said method comprising the steps of:
   introducing ingredients including a fibrous material and reactor flake polypropylene into the barrel of an extruder equipped with at least one flighted, axially rotatable screw and an extrusion die; and
   rotating said screw to sequentially advance said ingredients along the length of said barrel and through said extrusion die to yield the composite product.

2. The method of claim 1, wherein said fibrous material is present in said ingredients at a level of from about 20–80% by weight, based upon the total weight of the ingredients taken as 100% by weight.

3. The method of claim 1, wherein said polypropylene is present in said ingredients at a level of from about 20–80% by weight, based upon the total weight of the ingredients taken as 100% by weight.

4. The method of claim 1, wherein said fibrous material is selected from the group consisting of sawdust, newspaper, alfalfa, wheat pulp, wood scraps, wood veneers, wood laminates, cardboard, straw, cotton, rice hulls, paper, coconut shells, peanut shells, bagasse, plant fibers, bamboo fiber, palm fiber, kenaf, and mixtures thereof.

5. The method of claim 1, wherein said polypropylene has a melt index at 230° C. of from about 0–10 g/10 mm.

6. The method of claim 1, wherein said polypropylene has a bulk density of from about 20–40 lbs/ft$^3$.

7. The method of claim 1, wherein said reactor flake polypropylene has an average particle size of from about 350–1,000 µm.

8. The method of claim 1, wherein said fibrous material has an average fiber length of less than about ½ inch.

9. The method of claim 1, wherein said fibrous material comprises particles having an average length:thickness ratio of at least about 10:1.

10. The method of claim 1, wherein said composite product has an ASTM D-6109 flexural modulus of from about 600–1,100 psi/1000.

11. The method of claim 1, wherein said composite product has an actual density of from about 40–60 lbs/ft$^3$.

12. The method of claim 1, wherein said extruder is equipped with two rotatable screws, said rotating step comprising the step of rotating both rotatable screws to effect said advancement of said ingredients.

13. The method of claim 1, wherein said screw is rotated at a rate of from about 10–50 rpm.

14. The method of claim 1, wherein said ingredients obtain a temperature of from about 150–260° C. in said extruder barrel.

15. The method of claim 1, wherein said ingredients are advanced through said extruder barrel at a rate of from about 500–2,000 lbs/hr.

16. The method of claim 1, wherein the retention time of said ingredients in said extruder barrel is from about 20–120 seconds.

17. The method of claim 1, further including the step of blending the ingredients immediately prior to said introducing step.

18. The method of claim 17, said extruder comprising an inlet section and wherein said blending step comprises placing said ingredients into a weigh blender positioned adjacent said inlet section so as to cause said ingredients to remain substantially blended prior to and during said introducing step.

* * * * *